A. M. MUCKENFUSS.
METHOD OF AND APPARATUS FOR TESTING PAINT.
APPLICATION FILED JULY 30, 1909.
1,014,842.
Patented Jan. 16, 1912.
2 SHEETS—SHEET 1.
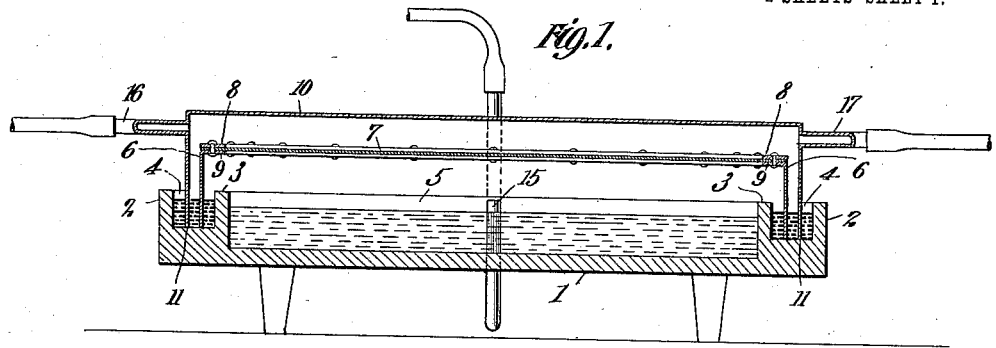
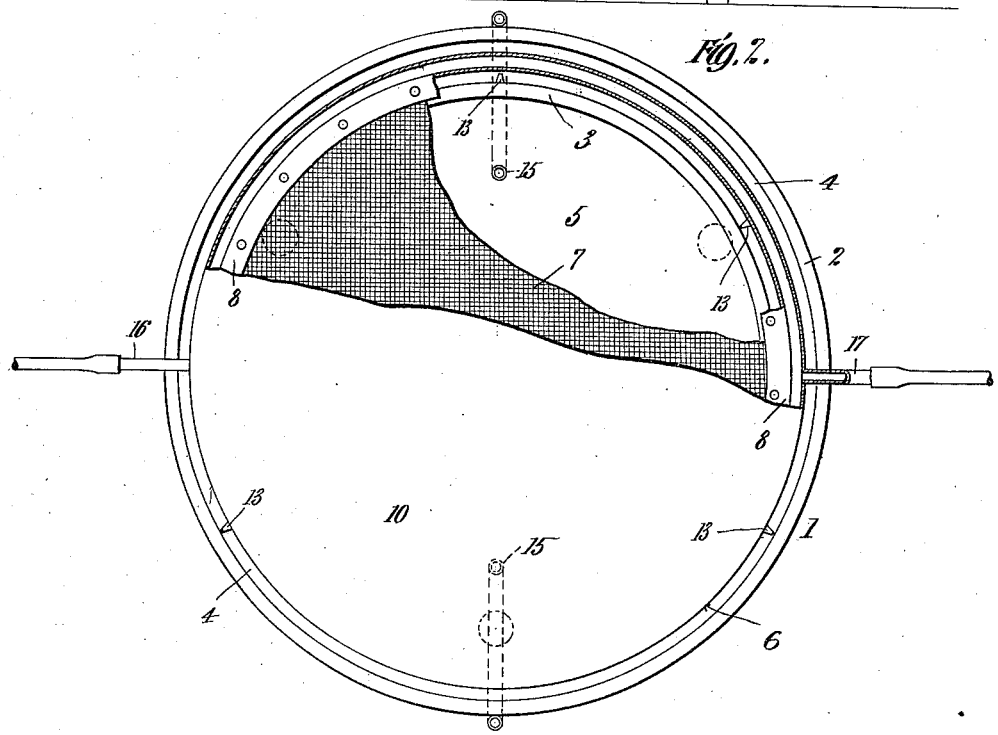
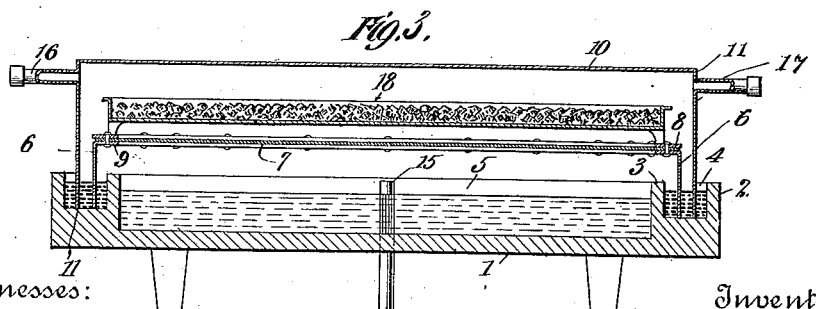

A. M. MUCKENFUSS.
METHOD OF AND APPARATUS FOR TESTING PAINT.
APPLICATION FILED JULY 30, 1909.
1,014,842.
Patented Jan. 16, 1912.
2 SHEETS—SHEET 2.
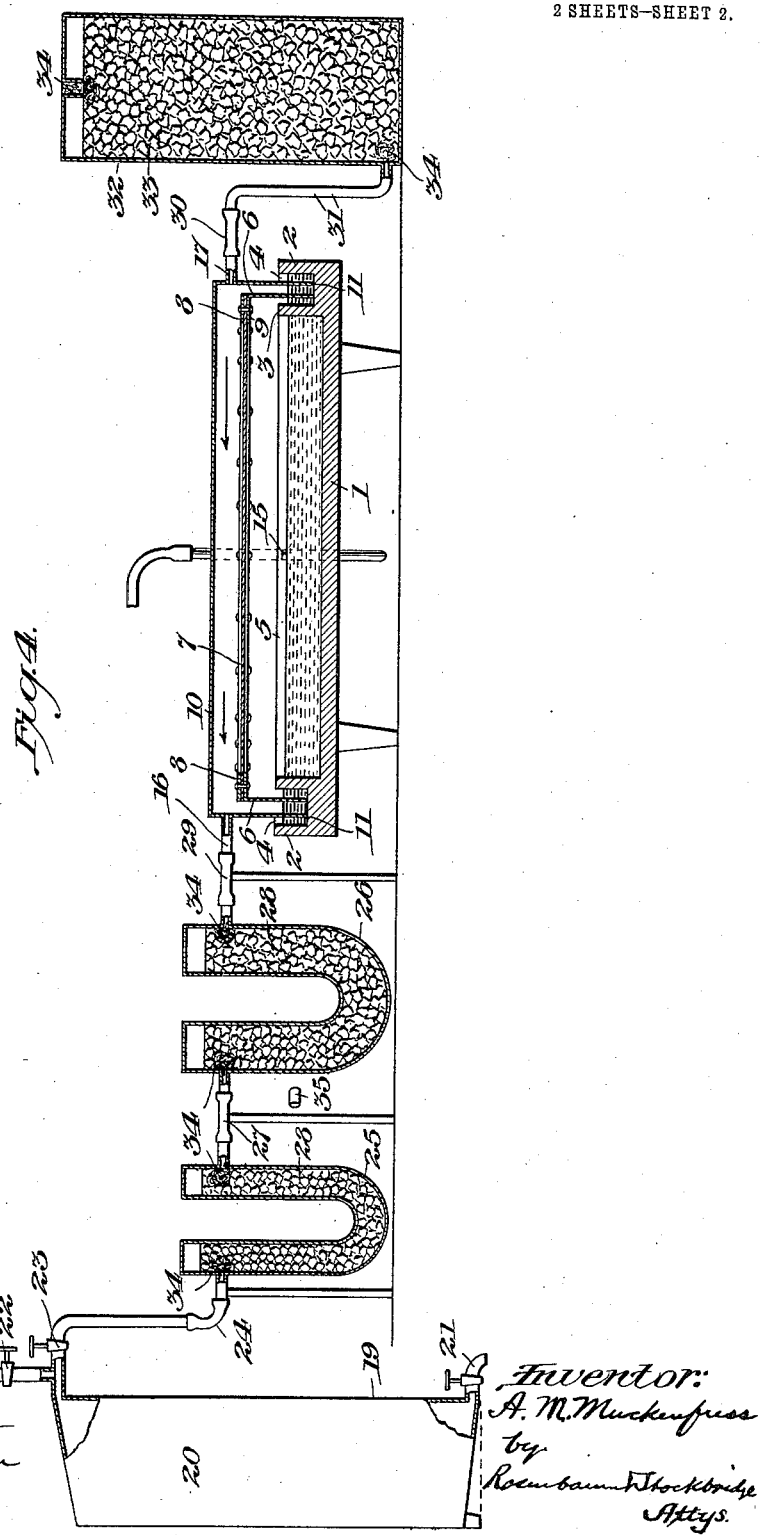

UNITED STATES PATENT OFFICE.

ANTHONY M. MUCKENFUSS, OF UNIVERSITY, MISSISSIPPI.

METHOD OF AND APPARATUS FOR TESTING PAINT.

1,014,842.  Specification of Letters Patent.  Patented Jan. 16, 1912.

Application filed July 30, 1909. Serial No. 510,439.

*To all whom it may concern:*

Be it known that I, ANTHONY M. MUCKENFUSS, a citizen of the United States, residing at University, in the State of Mississippi, have invented certain new and useful Improvements in Methods of and Apparatus for Testing Paint, of which the following is a full, clear, and exact description.

This invention relates to a method of and apparatus for testing paint.

Considered in its aspects as a method the present invention consists in subjecting a painted porous diaphragm to water or other vapor on one side thereof, and maintaining dry air within a hermetically sealed inclosure into which a perfectly definite and measured area of the other side of said diaphragm is exposed. The moisture taken up by the dry air is thereupon collected and weighed and corresponds of course to the amount passing through the painted porous diaphragm. Substantially the same procedure as above may be employed for determining the adhesion of the paint to the diaphragm, and I therefore desire to also include the latter purpose within the scope of the method of this invention.

Considered in its aspects as an apparatus the present invention consists in a frame having an opening across which a porous diaphragm is adapted to be stretched, and means coöperating with said frame for providing a pair of sealed cavities or chambers into which opposite sides of said diaphragm are exposed throughout their entire area. In practice, I make use of a mercury seal which has the double advantage of being absolutely hermetical as a seal, besides being removable and replaceable for any number of repeated tests providing for the latter under identical conditions at each repetition. This seal is also cheap and simple to construct.

My invention further consists in the features of construction and combination as hereinafter set forth and claimed.

In the drawings: Figure 1 is a vertical sectional view of a paint testing apparatus embodying the principles of my invention. Fig. 2 is a plan view of the same partly broken away. Fig. 3 is a vertical sectional view showing a modification. Fig. 4 is a view, partly in section, showing the general arrangement of the paint testing appliance in connection with one form of apparatus suitable for use in connection therewith when determining the amount of vapor passed through the paint film.

Referring to the drawings in which like parts are designated by the same reference sign, 1 denotes a base which I preferably make of cast-iron having a circumferential flange or rim 2 and a second flange or interior rim 3 concentric with and separated from the outside rim by a narrow trough or channel 4.

5 denotes a central cavity or basin of the base bounded by the rim 3.

6 designates a hoop or frame having a large central opening across which a porous diaphragm 7 is adapted to be stretched. Any desired means may be employed for clamping the diaphragm to the hoop 6. for example, another concentric hoop or band. I have shown for the purposes of illustration, an annular ring or plate 8 adapted to be riveted or bolted to an internally extending flange 9 of the hoop 6.

10 denotes a cover of shallow cup-shaped form with a peripheral depending edge 11. The edge 11 and the hoop 6 are both adapted to simultaneously enter the trough or channel 4 of the base, the latter being concentrically contained within the former, and separated therefrom by a short distance. This distance and the disposition of the hoop 6 and edge 11 within the trough 4 are such that when said trough is filled with mercury, it establishes a perfect seal. Pins 13 may be provided to maintain the parts properly located in said trough and prevent the seal from being broken by reverse capilarity, which might displace the mercury from proper sealing relation in case a sufficient distance was not provided between the hoop 6 and the edge 11.

15 denote pipes projecting upwardly from the base 1 into the central cavity 5 thereof and which serve as vents to maintain a proper air pressure. It is evident that any desired gas or vapor can be supplied through these pipes.

16, 17, respectively denote inlet and discharge pipes at diametrically opposite points of the cover 10. A current of dry air is intended to pass through these pipes, in which case it of course traverses the chamber within the cover 10, this chamber having exposed therein the upper surface of the diaphragm 7. The lower surface of the diaphragm is at the same time exposed to the vapor within the cavity 5 of the base. The respective chambers or cavities on both sides of the diaphragm are therefore separated from one another by the mercury seal, which may be considered an absolutely impassable barrier for gas or vapor of any sort. Any vapor which finds its way from one chamber to another must therefore pass through the diaphragm 7. This diaphragm is of closely woven fabric or other porous substance and is painted with the paint for which a test is required. The paint may be on either or both sides of the diaphragm. In view of the fact that the chambers or cavities on both sides of the diaphragm are hermetically closed (except for their vent or inlet pipes which may be controlled as desired) the transfer of vapor through the diaphragm may be measured either by ascertaining the loss in the inner cavity or the gain in the outer cavity, or both. Of course any liquid or vapor or gas may be employed and under any desired conditions of temperature or pressure. An alternative arrangement is that shown in Fig. 3 in which there is no air current arranged for in the upper chamber, but merely a shelf, cage or weighing tray 18 is provided, adapted to be hermetically covered when it is desired to remove and weigh the same, and which is supplied with calcium chlorid or the like adapted to absorb liquid vapor. The gain in weight in a definite time shows the vapor traversing the diaphragm in this case.

Referring to Fig. 4 in which is shown a set of apparatus in connection with one form of my novel paint testing appliance, an aspirator bottle 19 is filled with a known volume of water 20. Before starting the test the bottle is completely filled with water by attaching a hose to the spout adjacent the stop cock 21, cock 22 being open and cock 23 being closed. Then all cocks are closed and when the test begins cock 23 is opened fully and cock 21 is opened sufficiently to drop water out at a known rate. This draws an equivalent volume of air in the direction of the arrows, successively through the several parts of the apparatus. A spout reaching from cock 23 is connected by means of a flexible tube 24 to a U-shaped tube 25, which in turn is connected to a similar tube 26, preferably by means of a flexible tube 27. Tubes 25 and 26 are filled with a suitable absorbent material in lumps so as to offer no appreciable resistance to the passage of the air through said tubes. This material may be, for example, calcium chlorid. Tube 28 is in turn connected by means of flexible tube 29 to the apparatus shown in Fig. 1 by means of the short tubular extension 16 thereof; while correspondingly the oppositely disposed short tube 17 is connected by means of the flexible tube 30 with a conduit or tube 31 which extends laterally from the bottom of a jar 32. This latter is also filled with lump absorbent material 33, preferably of the same chemical composition as that used in tubes 25 and 26. The upper outlet of the jar, and the lower outlet thereof, as also the respective inlets and outlets of the tubes 25 and 26, are plugged with cotton 34, or the like, to prevent the passage of dust through the apparatus. Preparatory to weighing the tubes 25 and 26, the flexible tubes 24 and 29, and if desired, also tube 27, are plugged with suitable plugs such as are indicated at 35 so as to prevent any evaporation of moisture or any additional absorption thereof from the atmosphere by the material in the tubes. In operation therefore air will be drawn successively through the jar 32, the upper chamber of the paint testing appliance, tubes 26 and 25, and from thence into the upper portion of the aspirator bottle, and the volume of air so passed through the paint testing apparatus may be accurately ascertained.

The use of the apparatus and the method of the invention will be understood from the foregoing description. The diaphragm is merely painted on one or both sides, and tested, then perhaps allowed to dry or be subjected to the weather or exposure, if desired, for either a short or protracted period and again tested. For the purpose of the test the trough 4 is filled with mercury and the hoop 6 with its diaphragm 7 placed in position. Before this the cavity 5 is supplied with water in measured quantity, if desired, and the vapor from this water passes through the paint slowly by virtue of the porosity thereof. The amount of water vapor passing is evidently proportionate to the permeability of the paint used. The vapor which traverses the paint is all collected in the outer chamber and carried away by the current of dry air therein. All this vapor may subsequently be collected from the air and measured, by calcium chlorid or some equivalent means; many of which are commonly known.

It will be particularly observed that inasmuch as the diaphragm is stretched across a hoop and subsequently painted, that the painted surface is never afterward wrinkled or compressed or in any way subjected to strains or pressure or rough handling or treatment which might vitiate the test and make it unlike the conditions where paint is applied to a solid surface such as a wall or dwelling. Secondly, the surface of the paint exposed corresponds exactly to the area of the diaphragm, and this area is exact and predetermined in all cases. Thirdly, two chambers are formed on opposite sides of the diaphragm and both of these are absolutely hermetically sealed, the inner one being particularly adapted to receive a liquid and the outer to receive an air current, in accordance with the method specified, although these particular uses are not essential. Fourth, the temperature and barometric conditions are equalized on both sides of the diaphragm so that no correction is ever required by virtue of variation in these factors. And finally the nature of the apparatus is such that its component parts are removable and replaceable whenever desired, and adapted to give any number of easily arranged for tests, under identical conditions at each repetition. With this simple apparatus different paints, varnishes and the like may be accurately rated in matters of their values from the standpoints of porosity and adhesive power and durability.

The greatest value of the foregoing apparatus resides in its ability to determine the durability of any particular paint, or the relative durability of different paints, the durability being determined by measurement of the permeability of the paint after different stages of exposure. For example, if two different kinds of paint showed the same permeability when freshly applied, and showed differing permeability after a period of exposure to climatic or other conditions, it is evident that the paint showing the least permeability at the second test is the more durable, and in proportion to the degree that its permeability remains unchanged.

In making the test according to Fig. 3, the time or duration of the test is the factor which it is necessary to establish and control, instead of measuring a quantity of air supplied as is the case with Figs. 1 and 2. With a paint of given permeability the amount of vapor passing from the lower to the upper chamber is proportional to the time or interval occupied by the test, so that the measure of this time and the measure of the vapor absorbed by the substance in the tray 18 are the only data required; the area and thickness of the diaphragm being the same.

What I claim, is:—

1. A method of testing paint or the like which comprises forming a film of the substance to be tested, exposing one side of said film to a mass of vapor capable of passing through the pores of said film, permitting said vapor to pass through said pores for a substantially definite period, absorbing the vapor which thus passes through said film by absorptive material, and measuring the quantity of the vapor so absorbed.

2. A method of testing paint which consists in exposing a porous diaphragm coated with the paint to be tested within a chamber or cavity containing water vapor on one side of said diaphragm, simultaneously exposing the other side of the diaphragm within a second closed chamber or cavity absorbing substantially all of the vapor which may pass through said diaphragm by a vapor absorbing medium, and finally determining the weight of vapor so absorbed in a given interval of time.

3. A method of testing paint or the like which comprises forming a film of the substance to be tested, exposing one side of said film to aqueous vapor, permitting said vapor to pass through said pores for a substantially definite period, absorbing the vapor which thus passes through said film by absorptive material capable of absorbing aqueous vapor, and measuring the quantity of aqueous vapor as absorbed.

4. In an apparatus for testing paint, a porous diaphragm adapted to be coated with the paint to be tested, means coöperating with said diaphragm to establish a chamber or cavity on one side thereof adapted to hold vapor, means also coöperating with the diaphragm to establish a second closed chamber or cavity on the other side of said diaphragm also adapted to hold vapor, and means for accurately determining the amount of vapor which traverses the diaphragm from the first to the second chamber mentioned, said means comprising vapor collecting material.

5. In an apparatus for testing paint, a porous diaphragm adapted to be coated with the paint to be tested, means removable and replaceable with respect to said diaphragm for establishing a chamber or cavity on one side thereof adapted to hold vapor, means also coöperating with the diaphragm to establish a second closed chamber or cavity on the other side thereof also adapted to hold vapor and also removable and replaceable with respect to the diaphragm, and means for accurately determining the amount of the vapor which traverses the diaphragm from the first to the second chamber mentioned, said means comprising vapor collecting material.

6. In an apparatus for testing paint, a porous diaphragm adapted to be coated with the paint to be tested, means for establishing a pair of chambers or cavities on either side of the diaphragm hermetically sealed from one another, each adapted to hold vapor and means for determining the amount of the vapor which traverses the diaphragm between the respective chambers, said means comprising vapor collecting material.

7. In an apparatus for testing paint, a porous diaphragm adapted to be coated with the paint to be tested, means removable and replaceable with respect to said diaphragm for establishing a pair of hermetically sealed chambers on either side thereof, each adapted to hold vapor and means for determining the amount of the vapor which traverses the diaphragm from the first to the second chamber mentioned, said means comprising vapor collecting material.

8. In an apparatus for testing paint, a porous diaphragm adapted to be coated with the paint to be tested, means including a liquid seal and coöperating with said diaphragm to establish a pair of chambers or cavities on either side thereof hermetically sealed from one another, and each adapted to hold vapor and means for determining the amount of the vapor which traverses the diaphragm from the first to the second chamber mentioned, said means comprising vapor collecting material.

9. In an apparatus for testing paint, a porous diaphragm adapted to be coated with the paint to be tested, a hoop for supporting said diaphragm, a base having a trough or channel, a cap having a depending circumferential edge, and a liquid seal in said trough or channel, said edge and said hoop being adapted to enter said channel concentrically one within another.

10. In an apparatus for testing paint, a porous diaphragm adapted to be coated with the paint to be tested, a hoop for supporting said diaphragm, a base having a trough or channel and having an interior cavity adapted to contain water, a cap having a depending circumferential edge, said edge and said hoop fitting in said channel concentrically within one another, a liquid seal in said channel, and means for obtaining a measurement of the vapor which traverses the diaphragm from the inner to the outer chamber formed.

11. A method of testing paint which consists in exposing a porous diaphragm coated with the paint to be tested within the chamber or cavity containing vapor on one side of said diaphragm, simultaneously exposing the other side of the diaphragm within a second completely closed chamber or cavity containing a substance adapted to absorb the vapor, and measuring the weight of vapor absorbed by said substance in a given time interval.

12. In an apparatus for testing paint, a porous diaphragm adapted to be painted with the paint to be tested, means coöperating with said diaphragm to establish a chamber or cavity on one side thereof, means also coöperating with the diaphragm to establish a second completely closed chamber or cavity on the other side of said diaphragm, and a cage or tray in said second chamber or cavity for containing a vapor absorbing substance.

In witness whereof, I subscribe my signature, in the presence of two witnesses.

ANTHONY M. MUCKENFUSS.

Witnesses:
  ALFRED W. PROCTOR,
  WALDO M. CHAPIN.

---

Copies of this patent may be obtained for five cents each, by addressing the "Commissioner of Patents, Washington, D. C."